United States Patent
Choi

(10) Patent No.: US 9,774,806 B2
(45) Date of Patent: Sep. 26, 2017

(54) IMAGE SENSORS INCLUDING PIXEL ARRAYS

(71) Applicant: Samsung Electronics Co., Ltd., Suwon-si, Gyeonggi-do (KR)

(72) Inventor: Kyu-Sik Choi, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 232 days.

(21) Appl. No.: 14/610,381

(22) Filed: Jan. 30, 2015

(65) Prior Publication Data

US 2015/0373289 A1 Dec. 24, 2015

(30) Foreign Application Priority Data

Jun. 23, 2014 (KR) .................. 10-2014-0076736

(51) Int. Cl.
| | |
|---|---|
| *H04N 5/335* | (2011.01) |
| *H04N 5/365* | (2011.01) |
| *H04N 9/04* | (2006.01) |
| *H04N 5/374* | (2011.01) |
| *H04N 5/378* | (2011.01) |

(52) U.S. Cl.
CPC .......... *H04N 5/3658* (2013.01); *H04N 5/374* (2013.01); *H04N 5/378* (2013.01); *H04N 9/045* (2013.01)

(58) Field of Classification Search
CPC ....... H04N 5/3658; H04N 5/374; H04N 5/378
USPC ............................... 348/272, 294; 250/208.1
See application file for complete search history.

(56) References Cited

U.S. PATENT DOCUMENTS

| | | | |
|---|---|---|---|
| 6,417,717 B1 | 7/2002 | Loinaz | |
| 6,950,132 B1 | 9/2005 | Kozuka | |
| 6,995,346 B2 | 2/2006 | Johanneson et al. | |
| 7,224,848 B2 | 5/2007 | Hoffinger et al. | |
| 7,355,638 B2 | 4/2008 | Mori | |
| 8,570,416 B2 | 10/2013 | Araki et al. | |
| 2007/0013796 A1* | 1/2007 | Ueno | H04N 9/045 348/272 |
| 2007/0146511 A1* | 6/2007 | Kinoshita | H04N 5/335 348/272 |
| 2008/0226176 A1* | 9/2008 | Teng | G09G 5/395 345/560 |
| 2008/0284889 A1* | 11/2008 | Kinoshita | H04N 5/361 348/308 |

(Continued)

FOREIGN PATENT DOCUMENTS

| | | |
|---|---|---|
| JP | 2007-104450 | 4/2007 |
| KR | 1020020058451 A | 7/2002 |

*Primary Examiner* — Sinh Tran
*Assistant Examiner* — Zhenzhen Wu
(74) *Attorney, Agent, or Firm* — Ward and Smith, P.A.

(57) ABSTRACT

An image sensor capable of preventing generation of a line-type defect is disclosed. The image sensor includes a row driver, a pixel array, an analog signal processor, a data mapping buffer and a row data buffer. The pixel array has a layout configuration having a nonlinear pattern for a row path and a column path, receives optical signals and converts the optical signals into electric signals, and outputs the electric signals as image signals in response to the pixel control signals. The analog signal processor performs analog-to-digital conversion on the image signals to generate first signals. The data mapping buffer compensates position errors caused by the layout configuration of the zigzag pattern for the first signals to generate a second signals.

18 Claims, 16 Drawing Sheets

(56) References Cited

U.S. PATENT DOCUMENTS

| | | | |
|---|---|---|---|
| 2009/0122165 A1* | 5/2009 | Kinoshita | H04N 5/359 348/241 |
| 2010/0147950 A1* | 6/2010 | Kwan | G06K 7/10722 235/462.25 |
| 2010/0157126 A1* | 6/2010 | Compton | H04N 5/3458 348/311 |
| 2010/0207861 A1* | 8/2010 | Chang | G09G 3/3614 345/90 |

* cited by examiner

220a, 220b, MET

320a, 320b, MET

IMAGE SENSORS INCLUDING PIXEL ARRAYS

CROSS-REFERENCE TO RELATED APPLICATION

This application claims priority under 35 U.S.C. §119 to Korean Patent Application No. 10-2014-0076736 filed on Jun. 23, 2014, the disclosure of which is hereby incorporated by reference in its entirety.

BACKGROUND

Field

Embodiments of the inventive concepts relate to image sensors and image processing devices including image sensors.

Description of Related Art

An image sensor, such as a CMOS image sensor, may be used in various electronic devices, such as a camera of a mobile phone, a digital still camera, etc. The image sensor may take images in the field of vision, convert the images into electric signals, and convert the electric signals into digital image signals that can be stored, transmitted, etc. A digital image signal output from a CMOS image sensor typically includes color image data having three colors (red, green, and blue). Signal processing may be performed on a digital image signal to drive a display device, such as a liquid crystal display (LCD).

SUMMARY

Some embodiments of the inventive concept provide an image sensor capable of reducing generation of line-type defects.

Other embodiments of the inventive concept provide a method of operating an image sensor capable of reducing generation of line-type defects.

The technical objectives of the inventive concept are not limited to the above disclosure; other objectives may become apparent to those of ordinary skill in the art based on the following descriptions.

In accordance with an aspect of the inventive concept, an image sensor may include a row driver, a pixel array, an analog signal processor, a data mapping buffer and a row data buffer.

The row driver generates pixel control signals. The pixel array includes a plurality of rows and a plurality of columns each having pixels. The pixel array has a layout configuration having a nonlinear pattern for a row path and a column path, receives optical signals and converts the optical signals into electric signals, and outputs the electric signals as image signals in response to the pixel control signals. The analog signal processor samples the image signals, and performs analog-to-digital conversion on the sampled image signals to generate first signals. The data mapping buffer compensates a position error caused by the layout configuration of the zigzag pattern for the first signals to generate a second signals. The row data buffer selects one of signals of odd-numbered rows and signals of even-numbered rows of the second signals. The nonlinear pattern may, for example, be a zigzag pattern.

In an embodiment, the pixel control signals may include a storage control signal, a transfer control signal, a reset control signal, and a row selection signal.

In another embodiment, the image sensor may further include a column scanner configured to continuously select a unit circuit of the analog signal processor, the unit circuit corresponding to columns of the pixel array.

In still another embodiment, the image sensor may further include an image signal processor configured to compensate signals corresponding to bad pixels included in output signals of the row data buffer.

In yet another embodiment, the analog signal processor may include a first analog signal processor and a second analog signal processor.

The first analog signal processor samples image signals of an odd-numbered row of the image signals, and performs analog-to-digital conversion on the sampled image signals. The second analog signal processor samples image signals of an even-numbered row of the image signals, and performs analog-to-digital conversion on the sampled image signals.

In yet another embodiment, the first analog processor may be disposed under the pixel array, and the second analog signal processor may be disposed over the pixel array in a horizontal structure.

In yet another embodiment, the data mapping buffer may include a first data mapping buffer and a second data mapping buffer.

The first data mapping buffer compensates a position error caused by the layout configuration of the zigzag pattern for signals corresponding to odd-numbered row of the first signals. The second data mapping buffer compensates a position error caused by the layout configuration of the zigzag pattern for signals corresponding to even-numbered row of the first signals.

In yet another embodiment, two adjacent rows included in the pixel array may operate simultaneously.

In yet another embodiment, the row driver may include a first row driver that drives an odd-numbered row and a second row driver that drives an odd-numbered row. In a horizontal structure, the first row driver may be disposed beside a left side of the pixel array and the second row driver may be disposed beside a right side of the pixel array.

In yet another embodiment, metal lines of a row path and a column path may be disposed in the zigzag pattern so that only one pixel in a pixel block of (5*5) comprised of five rows and five columns is accessed.

In yet another embodiment, metal lines of a row path and a column path may be disposed in the zigzag pattern so that only one pixel in a pixel block of (9*9) comprised of nine rows and nine columns is accessed.

In yet another embodiment, a fixed pattern noise (FPN) may not be generated in a row direction and in a column direction in the pixel array.

In accordance with another aspect of the inventive concept, a method of operating an image sensor including a plurality of rows and a plurality of columns each having pixels may include receiving pixel control signals through metal lines disposed in a zigzag pattern for a row path and a column path; receiving optical signals and converting the optical signals into electric signals; outputting the electric signals as image signals in response to the pixel control signals; sampling the image signals and performing analog-to-digital conversion on the sampled image signals to generate first signals; compensating a position error caused by the layout configuration of the zigzag pattern for the first signals to generate a second signals; and selecting one of a signal of an odd-numbered row and a signal of an even-numbered row of the second signals.

In an embodiment, only one pixel in a pixel block of (5*5) comprised of five rows and five columns may be accessed through metal lines for a row path and a column path.

In another embodiment, only one pixel in a pixel block of (9*9) comprised of nine rows and nine columns may be accessed through metal lines for a row path and a column path.

In accordance with still another aspect of the inventive concept, an image sensor may include a row driver, a pixel array, an analog signal processor, a data mapping buffer and a row data buffer.

The row driver generates pixel control signals. The pixel array includes a plurality of rows and a plurality of columns each having pixels. The pixel array has a layout configuration having a zigzag pattern for a row path and a column path so that only one pixel in a pixel block of (5*5) comprised of five rows and five columns is accessed, receives optical signals and converts the optical signals into electric signals, and outputs the electric signals as image signals in response to the pixel control signals. The analog signal processor samples the image signals, and performs analog-to-digital conversion on the sampled image signals to generate first signals. The data mapping buffer compensates a position error caused by the layout configuration of the zigzag pattern for the first signals to generate a second signals. The row data buffer selects one of a signal of an odd-numbered row and a signal of an even-numbered row of the second signals.

In an embodiment, three groups of pixel control signals may be applied to each row of the pixel array.

In another embodiment, each of the three groups may include a storage control signal, a transfer control signal, a reset control signal and a row selection signal.

In still another embodiment, the image sensor may further include separated row drivers configured to generate the three groups of the pixel control signals.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings:

FIGS. 4A and 4B are diagrams illustrating methods of compensating a bad pixel using adjacent pixels when the bad pixel exists;

DETAILED DESCRIPTION OF THE EMBODIMENTS

Figure 1:
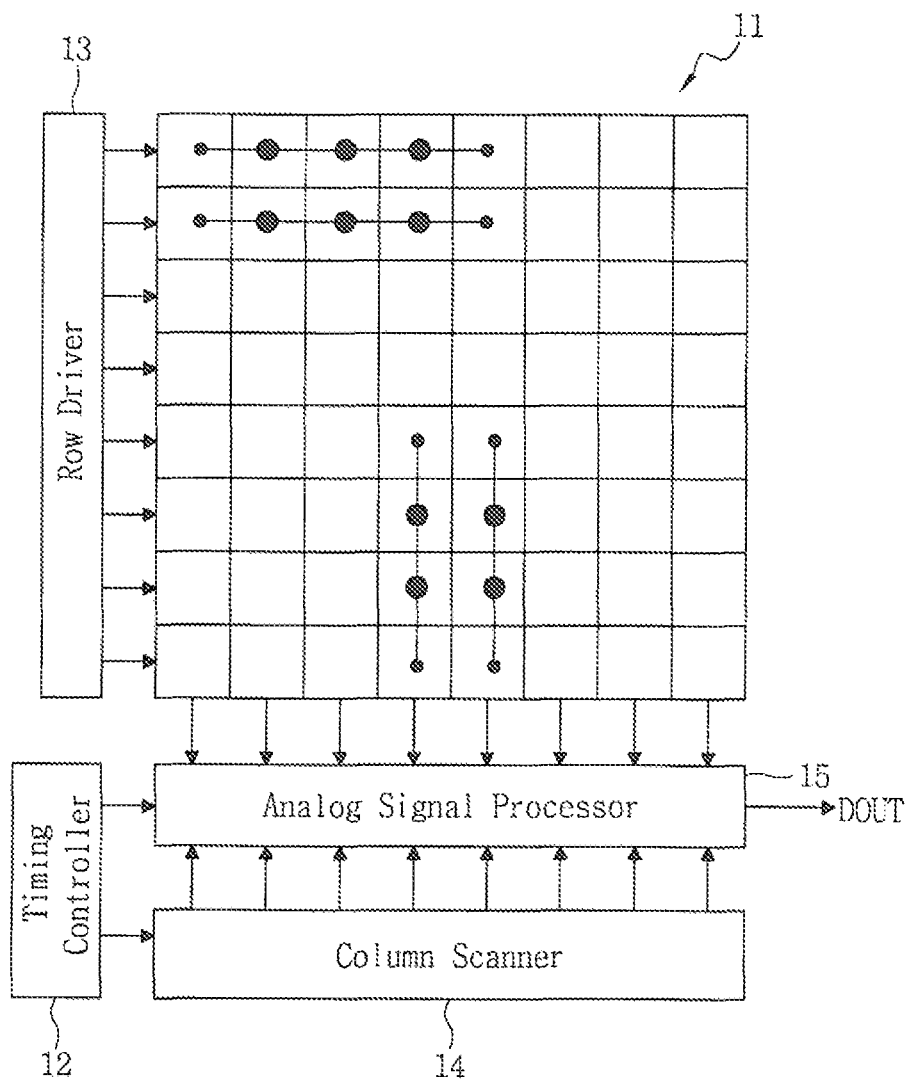
FIG. 1 shows a diagram illustrating an example of a conventional image sensor.

Specific structural and functional details disclosed herein are merely representative for purposes of describing example embodiments of the present inventive concepts, however, example embodiments of the present inventive concepts may be embodied in many alternate forms and should not be construed as limited to example embodiments of the inventive concepts described herein.

While the inventive concepts are susceptible to various modifications and alternative forms, specific embodiments thereof are shown by way of example in the drawings and will herein be described in detail. It should be understood, however, that there is no intent to limit the inventive concepts to the particular forms disclosed, but on the contrary, the inventive concepts cover all modifications, equivalents, and alternatives falling within the spirit and scope thereof.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

It will be understood that when an element or layer is referred to as being "on," "connected to" or "coupled with" another element or layer, it can be directly on, connected or coupled to the other element or layer or intervening elements or layers may be present. In contrast, when an element is referred to as being "directly on," "directly connected to" or "directly coupled with" another element or layer, there are no intervening elements or layers present. Like numerals refer to like elements throughout. As used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Meanwhile, when it is possible to implement any embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

The inventive concepts will now be described more fully with reference to the accompanying drawings, in which embodiments of the inventive concepts are shown.

FIG. 1 shows a diagram illustrating an example of a conventional image sensor 10.

Referring to FIG. 1, the conventional image sensor 10 includes a pixel array 11, a timing controller 12, a row driver 13, a column scanner 14, and an analog signal processor 15.

As shown in FIG. 1, in the pixel array of the conventional image sensor 10, metal lines that transmit signals in a row direction and in a column direction are arranged in a linear form. Therefore, when a portion of a metal line has a defect, a line-type noise may be generated in the pixel array 11. This noise is referred to as a fixed pattern noise (FPN).

Figure 2:
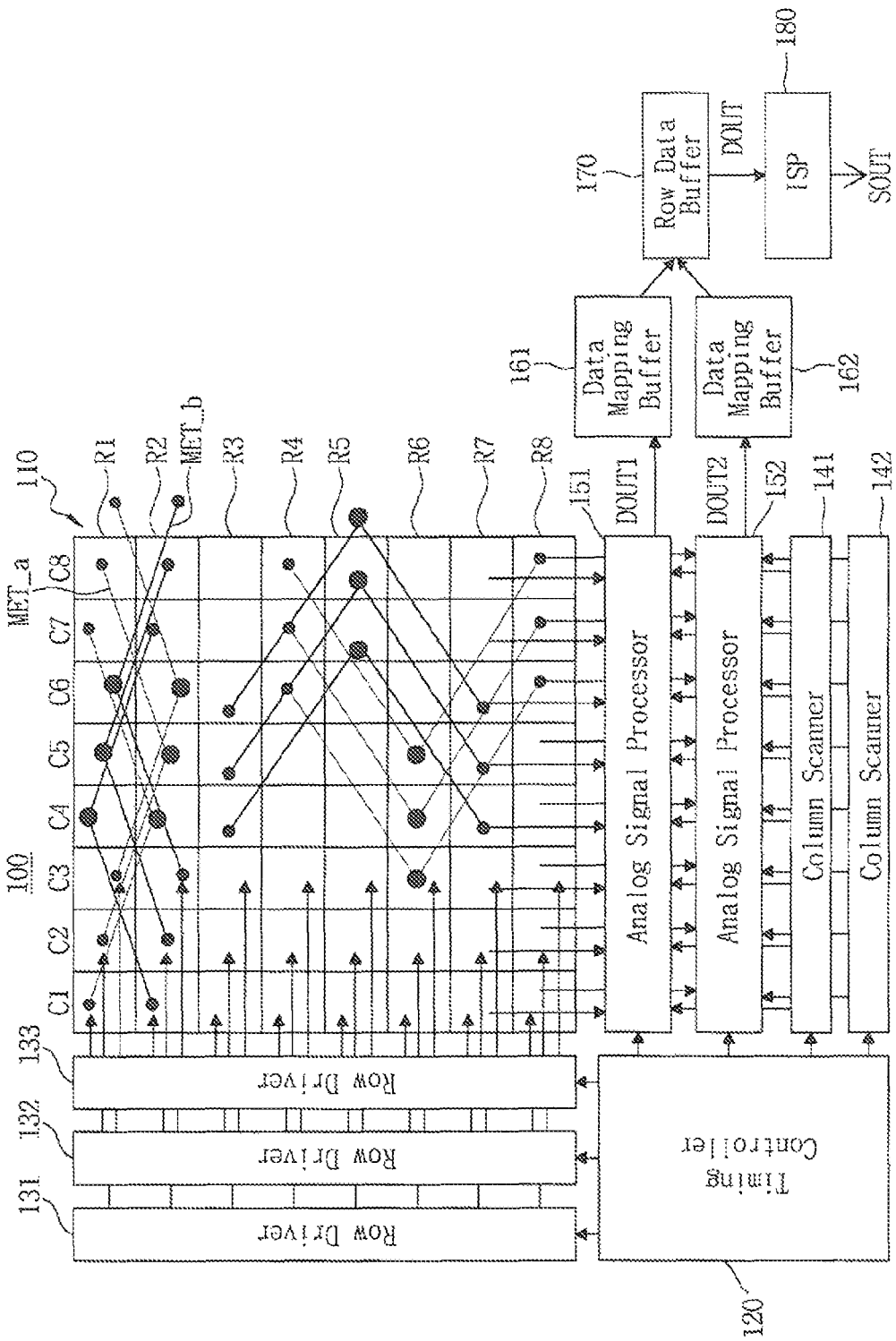
FIG. 2 is a block diagram illustrating an image sensor in accordance with an embodiment of the inventive concept.

FIG. 2 is a block diagram illustrating an image sensor 100 in accordance with an embodiment of the inventive concepts.

Referring to FIG. 2, the image sensor 100 may include a timing controller 120, row drivers 131, 132, and 133, a pixel array 110, analog signal processors 151 and 152, column scanners 141 and 142, data mapping buffers 161 and 162, a row data buffer 170, and an image signal processor 180.

The timing controller 120 generates control signals to control operations of the row drivers 131, 132, and 133, the analog signal processors 151 and 152, and the column scanners 141 and 142. The row drivers 131, 132, and 133 generate pixel control signals to provide to the pixel array 110. The pixel array 110 includes a plurality of rows R1 to R8 and a plurality of columns C1 to C8 each having pixels, and has a layout configuration having a nonlinear pattern, such as a zigzag pattern, for a row path and a column path. The pixel array 110 receives optical signals, converts the optical signals into electric signals, and outputs the electric signals as image signals in response to the pixel control signals. The pixel array 110 includes a plurality of pixels, and may include red pixels for converting a light of a red spectrum region to electric signals, green pixels for converting a light of a green spectrum region to electric signals, and blue pixels for converting a light of a blue spectrum region to electric signals. The analog signal processors 151 and 152 sample the image signals, and perform analog-to-digital conversion on the sampled image signals to generate first signals. The analog signal processors 151 and 152 may convert analog signals to digital signals using a correlated double sampling (CDS) method.

The column scanners 141 and 142 continuously select a unit circuit of the analog signal processor, the unit circuit corresponding to columns of the pixel array 110. The data mapping buffers 161 and 162 compensate position errors caused in the first signals by the layout configuration of the nonlinear pattern to generate second signals. The row data buffer 170 selects one of a signal of an odd-numbered row and a signal of an even-numbered row of the second signals. The image signal processor 180 may compensate signals corresponding to bad pixels included in output signals of the row data buffer 170 and outputs a signal SOUT.

In the embodiment of FIG. 2, the image signal processor 180 may be included either inside the image sensor 100 or outside the image sensor 100.

The first analog signal processor 151 samples image signals of an odd-numbered row of the image signals, and performs analog-to-digital conversion on the sampled image signals. The second analog signal processor 152 samples image signals of an even-numbered row of the image signals, and performs analog-to-digital conversion on the sampled image signals. The first column scanner 141 continuously selects a unit circuit of the first analog signal processor 151 corresponding to columns of the pixel array 110. The second column scanner 142 continuously selects a unit circuit of the second analog signal processor 152 corresponding to columns of the pixel array 110. The first data mapping buffer 161 compensates position errors caused by the layout configuration of the nonlinear pattern for signals corresponding to an odd-numbered row of the first signals. The second data mapping buffer 162 compensates position errors caused by the layout configuration of the nonlinear pattern for signals corresponding to an even-numbered row of the first signals.

In the embodiment of FIG. 2, three groups of pixel control signals may be applied to each row of the pixel array 110. The image sensor 100 may further include separated row drivers configured to generate the three groups of the pixel control signals. Each of the three groups may include a storage control signal (SG), a transfer control signal (TG), a reset control signal (RG) and a row selection signal (SEL).

Referring still to FIG. 2, the pixel array 110 may have a layout configuration having a nonlinear pattern, such as a zigzag pattern, for a row path and/or a column path. For example, a metal line MET_a in a row path may connect pixels at positions (R1, C2), (R2, C5), and (R1, C8), and a metal line MET_b in a row path may connect pixels at positions (R2, C3) and (R1, C6). That is, the metal line MET_a connects pixels from different physical rows into a single logical row that can be driven by a row driver. The pixels in the pixel array 110 can be connected in logical columns in a similar manner. As can be seen in FIG. 2, the logical rows do not correspond directly to the physical rows. For example, the physical row R1 includes the pixels at positions (R1, C1), (R1, C2), (R1, C3), etc. However the logical row corresponding to the metal line MET_a connect pixels at positions (R1, C2), (R2, C5), and (R1, C8), In the image sensor 100 of FIG. 2, metal lines of a row path and a column path may be disposed in the zigzag pattern so that only one pixel in a pixel block of (5*5) comprised of five rows and five columns is accessed by a given row path or column path.

In some embodiments, the metal lines of the row path and the column path may be disposed in the zigzag pattern so that only one pixel in a pixel block of (9*9) comprised of nine rows and nine columns is accessed by a given row path or column path.

In some embodiments, a metal line that accesses one pixel of a particular color of a (n*n) block does not access any other pixels of the same color in the (n*n) block that may be used for pixel compensation. In some embodiments, a metal line that accesses one pixel of a particular color may not access any of the nearest pixels of the same color. In this way, if a metal line is defective, the defect may only affect one pixel of a particular color in the (n*n) block, thereby allowing the bad pixel to be compensated by other pixels in the (n*n) block, as discussed in more detail below.

Metal lines of a column path of the pixel array 110 in the image sensor 100 may be disposed in the zigzag pattern.

Output signals of pixels may be output to the analog signal processors 151 and 152 through the metal lines of the column path. For example, the pixels included in a third row R3, a fifth row R5, and a seventh row R7 may be processed by the first analog signal processors 151, and the pixels included in a fourth row R4, a sixth row R6, and an eighth row R8 may be processed by the second analog signal processors 152.

Because metal lines are arranged in the zigzag pattern in the pixels of the image sensor 100, line-type defects may not be generated, although defects in an individual unit pixel may be generated when a portion of the metal lines has defects. That is, the image sensor 100 of FIG. 2 may reduce the generation of the line-type FPN. When defects in a unit pixel are generated, the defects may be compensated by the image signal processor 180.

Figure 3:
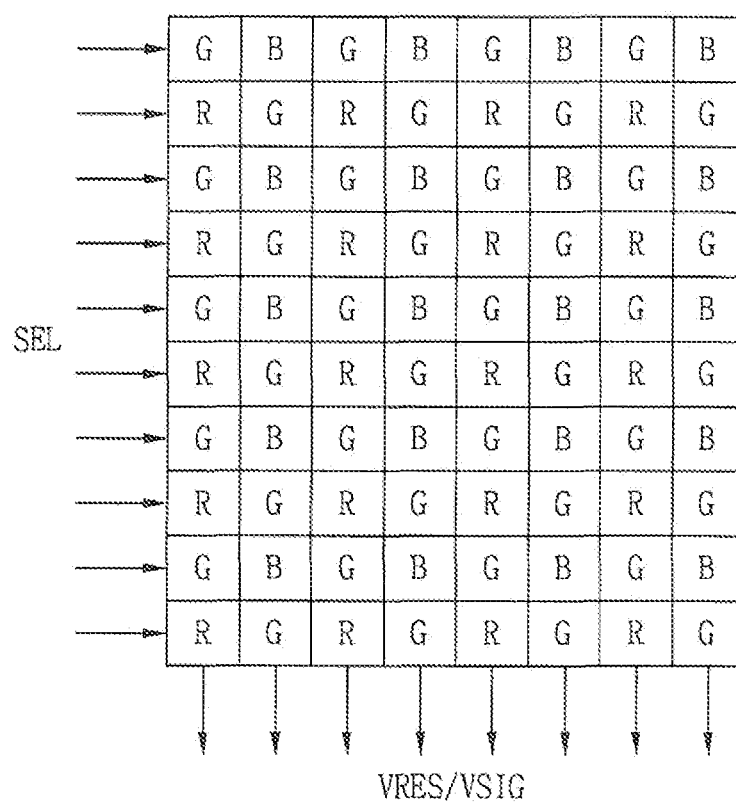
FIG. 3 is a diagram illustrating a color filter pattern of a pixel array included in the image sensor of FIG. 2.

FIG. 3 is a diagram illustrating a color filter pattern of the pixel array 110 included in the image sensor of FIG. 2.

Referring to FIG. 3, a color filter may be disposed on each pixel included in the pixel array 110*a*, so that a given pixel will receive only a light of a particular color. For example, three kinds of color filters may be disposed on each pixel included in the pixel array 110*a*. Generally, the color filters may be disposed in a Bayer pattern in which a first pattern of two colors of red R and green G are disposed in a row and a second pattern of two colors of green G and blue B are disposed in the next row. The green color G, which is related to brightness, may be disposed in all rows, and the red color R and the blue color B may be disposed in a staggered form for each row to enhance resolution.

In the image sensor 100 having a pixel structure described above, the pixel array 111*a* detects a light by a photodiode, and converts the light into electric signals to generate image signals.

Figures 4A, 4B:
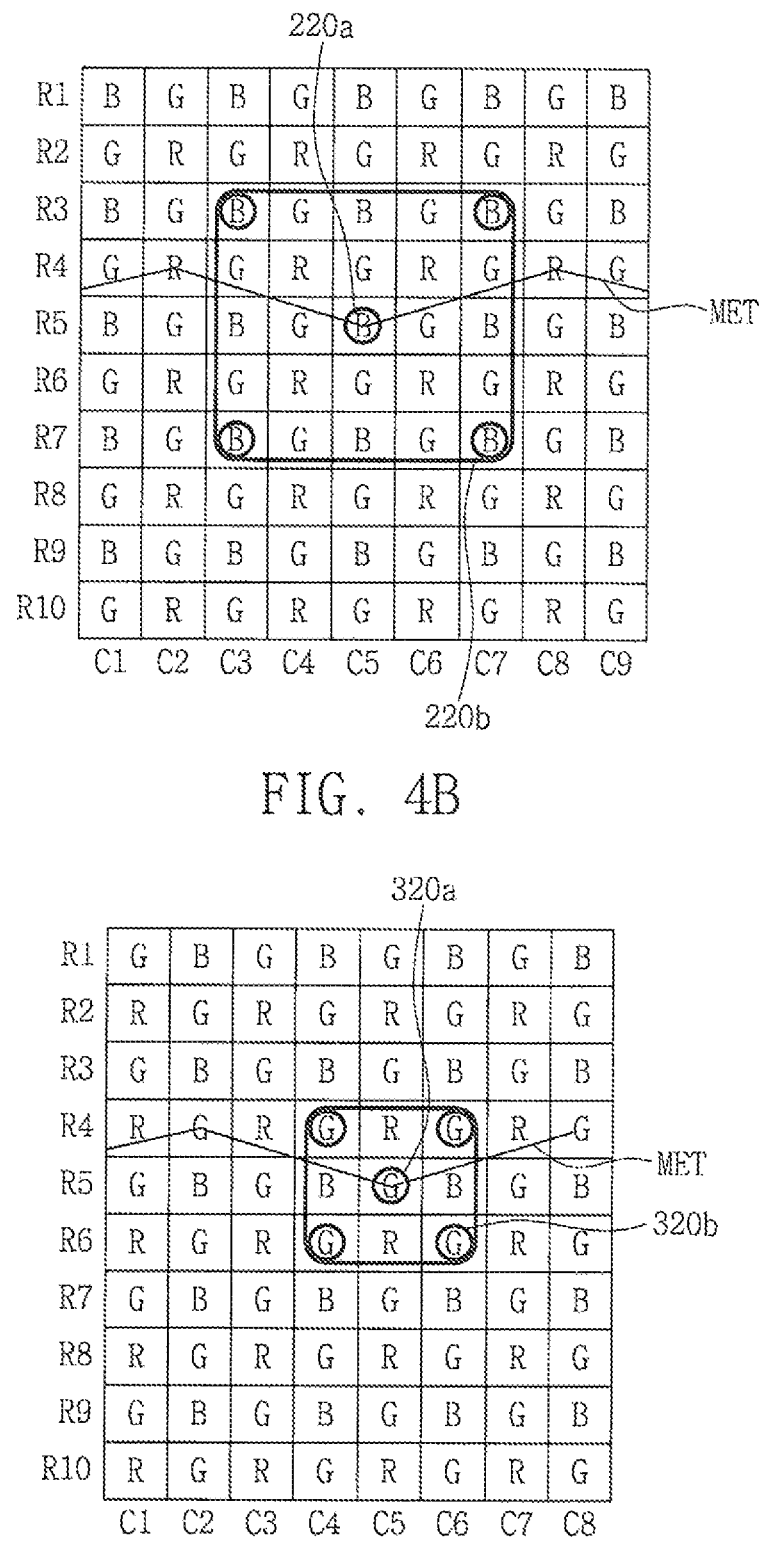

FIG. 4A is a diagram illustrating a method of compensating a bad pixel using adjacent pixels when it is determined that a pixel (the "bad" pixel) is defective.

Referring to FIG. 4A, when a defect is generated in a blue pixel 220*a* positioned at (R5, C5), that is a position at which a fifth row and a fifth column intersect, the pixel of a blue color B at (R5, C5) may be compensated using signals generated by blue pixels 220*b* that are nearest to the defective blue pixel at (R5, C5). In particular, as shown in FIG. 4A, when one pixel in a pixel block of (5*5) comprised of five rows and five columns has a defect, the defective pixel may be compensated using values of eight pixels around the defective pixel. Values of pixels at (R3, C3), (R3, C5), (R3, C7), (R5, C3), (R5, C7), (R7, C3), (R7, C5), and (R7, C7) may be used to compensate the pixel of blue color B at (R5, C5).

Note, however, that a metal line MET that connects to the defective pixel 320*a* positioned at (R5, C5) may not connect to the pixels 320*b* located at (R3, C3), (R3, C5), (R3, C7), (R5, C3), (R5, C7), (R7, C3), (R7, C5), or (R7, C7). Thus, the pixel values at those locations, which are used to compensate for the defective pixel 320*a*, may not be affected by a defect that affects the pixel at line (R5, C5).

Note further that, as shown in FIG. 3, the green pixels may be positioned more densely, e.g. in each row, as opposed to blue and red pixels which are positioned in alternating rows. Thus, a defective green pixel may be compensated using values of four pixels around the defective green pixel, which are not connected by the same metal row or column line that connects the defective pixel.

In general, for a given pixel having a first color, there are a plurality of pixels of the first color that are nearest to the pixel, and a plurality of pixels of the first color that are more distal from the first pixel. According to some embodiments, a metal line that connects to the pixel does not connect to any of the plurality of pixels of the first color that are nearest to the pixel, so that a defect in the metal line does not affect any of the nearest pixels, which may be used to compensate for defects in the pixel.

FIG. 4B is similar to FIG. 4A, except that the defective pixel 320*a* is a green pixel. When the pixels are arranged in a Bayer pattern, a defect generated in a green pixel 320*a* positioned at (R5, C5), may be compensated using signals generated by green pixels 320*b* that are nearest to the defective blue pixel 320*a* at (R5, C5). In particular, as shown in FIG. 4B, the defective pixel 320*a* may be compensated using values of four pixels 320*b* around the defective pixel 320*a*. That is, values of pixels at (R6, C4), (R6, C6), (R4, C4), and (R4, C6) may be used to compensate the pixel of green color G at (R5, C5). However, a metal row line MET that contacts to the defective pixel 320*a* may not connect to any of the four pixels 320*b* that are nearest to the defective pixel 320*a*.

Figure 5:
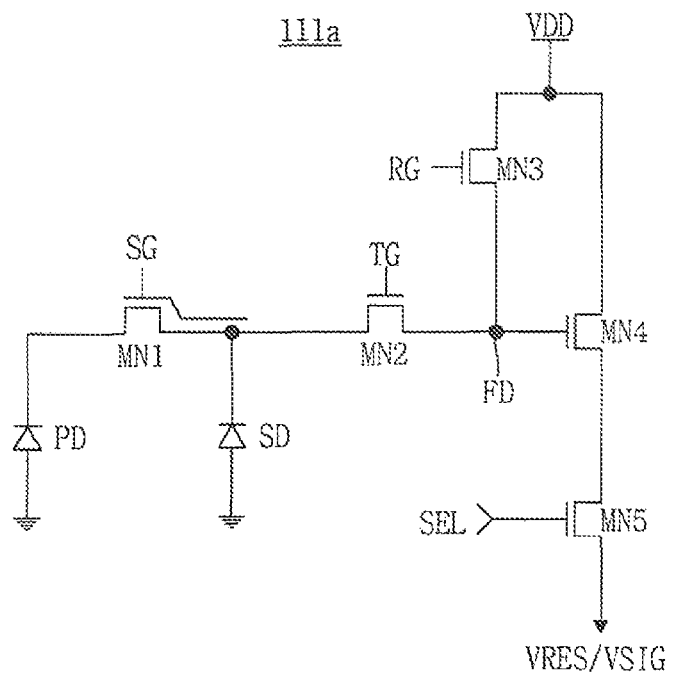
FIG. 5 is a circuit diagram illustrating a pixel driving circuit that drives a unit pixel of a pixel array included in the image sensor of FIG. 2, in accordance with an embodiment of the inventive concept.

FIG. 5 is a circuit diagram illustrating a pixel driving circuit 111*a* that drives a unit pixel of a pixel array 110 included in the image sensor of FIG. 2, in accordance with an embodiment of the inventive concepts.

Referring to FIG. 5, the pixel driving circuit 111*a* may include a photodiode PD, a storage diode SD and NMOS transistors MN1, MN2, MN3, MN4, and MN5. The first NMOS transistor MN1, which is called a storage transistor, operates in response to the storage control signal SC and transfers electric charges generated in the photodiode PD to the storage diode SD. A cathode of the storage diode SD may be a storage region. The second NMOS transistor MN2, which is called a transfer transistor, operates in response to the transfer control signal TG, and transfers electric charges accumulated in the storage diode SD to the floating diffusion node FD. The third NMOS transistor MN3, which is called a reset transistor, operates in response to the reset control signal R, and resets the floating diffusion node FD using the supply voltage VDD. The fourth NMOS transistor MN4, which is called a driving transistor, operates in response to a voltage of the floating diffusion node FD, and outputs an electric signal that is proportional to an amount of electric charges transferred from the storage diode SD to the floating diffusion node FD. The fifth NMOS transistor MN5, which is called a selecting transistor, operates in response to the row selecting signal SEL, and transmits an output signal of the fourth NMOS transistor MN4 to the analog signal processors 151 and 152. As illustrated in FIG. 5, the gate terminal of the first NMOS transistor MN1 may cover up a surface of the storage diode SD in the semiconductor integrated circuit.

The pixel driving circuit 111*a* may operate in a rolling shutter mode or in a global shutter mode based on the states of the control signals SG, TG, RG, and SEL. In a rolling shutter mode, signals photoelectrically converted from the photodiodes PD in each row in one frame are selected in order, and transferred to the respective floating diffusion nodes FD, and then corresponding image signals are output. In the global shutter mode, signals photoelectrically converted from the photodiodes PD in all the rows in one frame are selected at once, and transferred to the respective floating diffusion nodes FD, and then corresponding image signals are output in order from a selected row.

When the pixel driving circuit 111*a* of FIG. 5 operates either in the rolling shutter mode or in the global shutter mode, then when the reset control signal (RG) is enabled in each pixel selected by the row selecting signal SEL, a signal of the floating diffusion node FD transferred from the supply voltage VDD is output as a reset signal VRES. In addition, when the transfer control signal TG is enabled, a signal transferred from the photodiode PD to the floating diffusion node FD is output as an image signal VSIG. Generally, in the rolling shutter mode, the image signal is output after the reset signal VRES is output. However, in the global shutter mode, the image signal VSIG is output before the reset signal VRES is output. When the analog-to-digital conversion is performed using a CDS method, the analog signal processors 151 and 152 may convert an image signal VSIG having an analog form into a digital signal based on a difference between the image signal VSIG and the reset signal VRES. The control signals SG, TG, RG, and SEL applied to the pixel driving circuit 111a may be generated by the row drivers 131, 132, and 133 in FIG. 2.

Figure 6:
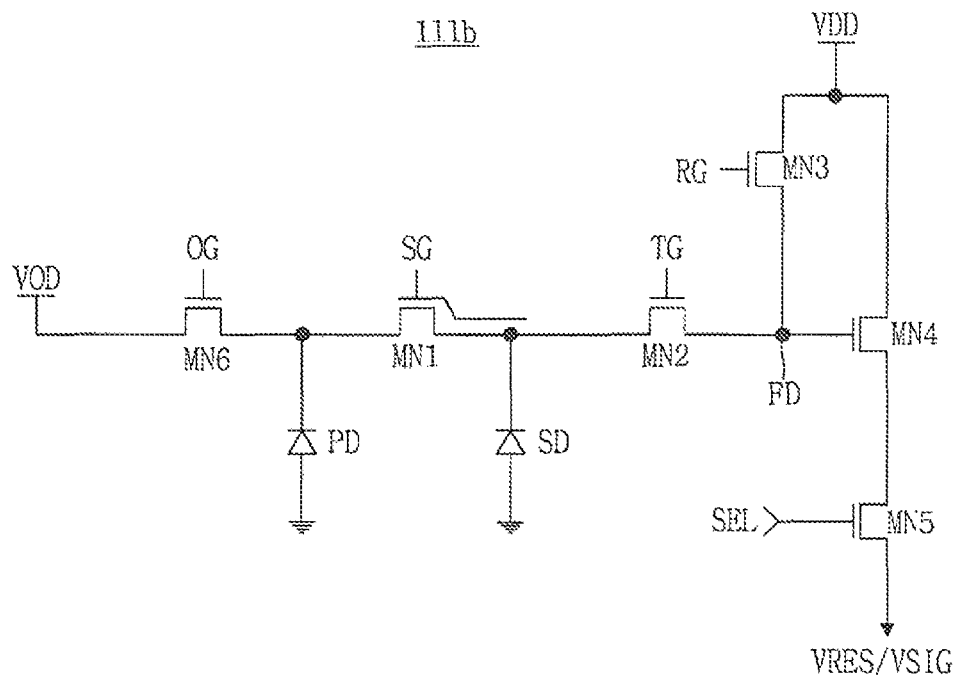
FIG. 6 is a circuit diagram illustrating a pixel driving circuit that drives a unit pixel of a pixel array included in the image sensor of FIG. 2, in accordance with another embodiment of the inventive concept.

FIG. 6 is a circuit diagram illustrating a pixel driving circuit 111b that drives a unit pixel of a pixel array included in the image sensor 100 of FIG. 2, in accordance with another embodiment of the inventive concept.

Referring to FIG. 6, the pixel driving circuit 111b may include a photodiode PD, a storage diode SD, and NMOS transistors MN1, MN2, MN3, MN4, MN5, and MN6. The pixel driving circuit 111b has a configuration in that the NMOS transistor MN6 is added to the pixel driving circuit 111a of FIG. 5. The NMOS transistor MN6 operates in response to an overflow control signal OG, and may functions to prevent electric charges in the photodiode region, that is a cathode of the photodiode PD, from overflowing. The pixel driving circuit 111b may operate in a similar manner as the pixel driving circuit 111a of FIG. 5.

Figure 7:
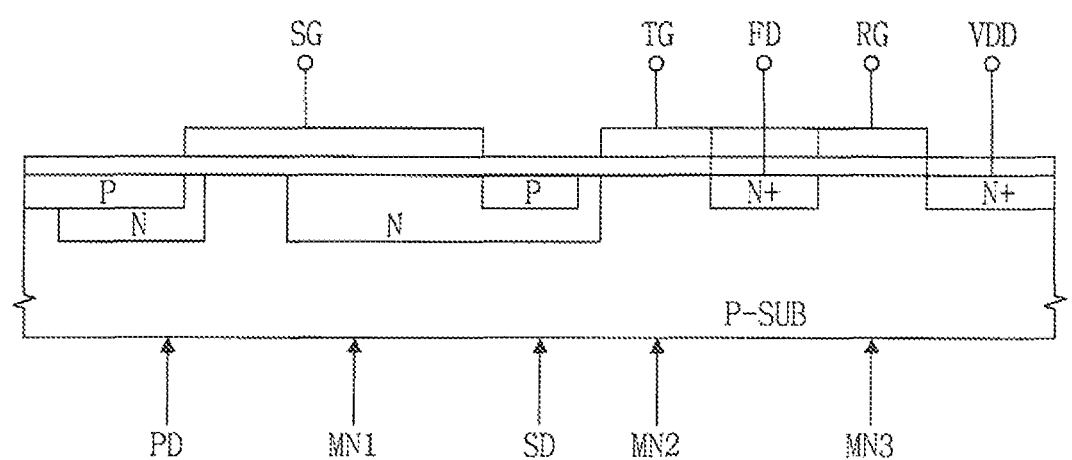
FIG. 7 is a cross-sectional diagram illustrating a vertical structure of an integrated circuit for the pixel driving circuit of FIG. 5, in accordance with an embodiment of the inventive concept.

FIG. 7 is a cross-sectional diagram illustrating a vertical structure of an integrated circuit for the pixel driving circuit of FIG. 5, in accordance with an embodiment of the inventive concepts. In FIG. 5, the photodiode PD, the storage diode SD, and NMOS transistors MN1, MN2, and MN3 are shown.

Electric charges generated in the photodiode PD region may be transferred to the storage diode SD region in response to the storage control signal SG, then electric charges in the storage diode SD region may be transferred to the floating diffusion node FD in response to the transfer control signal TG. The electric charges generated in the photodiode PD region may be transferred by electrons.

Figure 8:
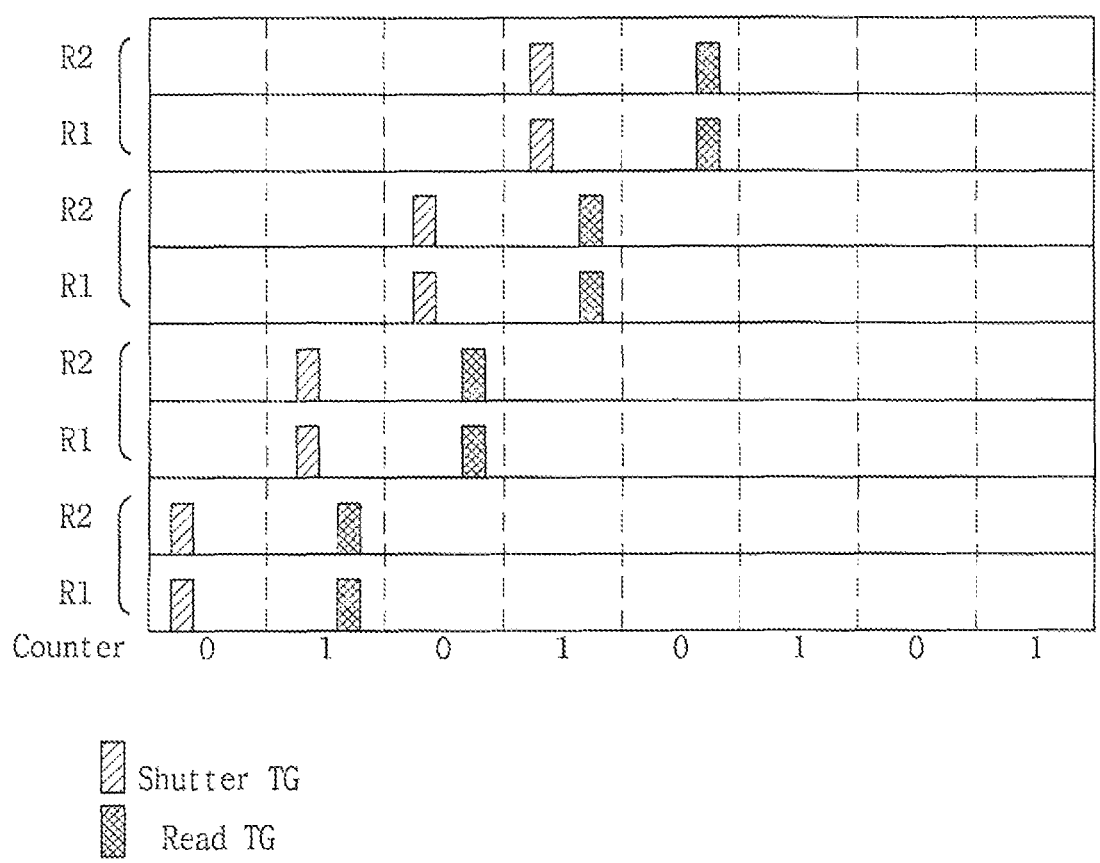
FIG. 8 is a timing diagram illustrating an operation of the image sensor of FIG. 2.
Figure 9:
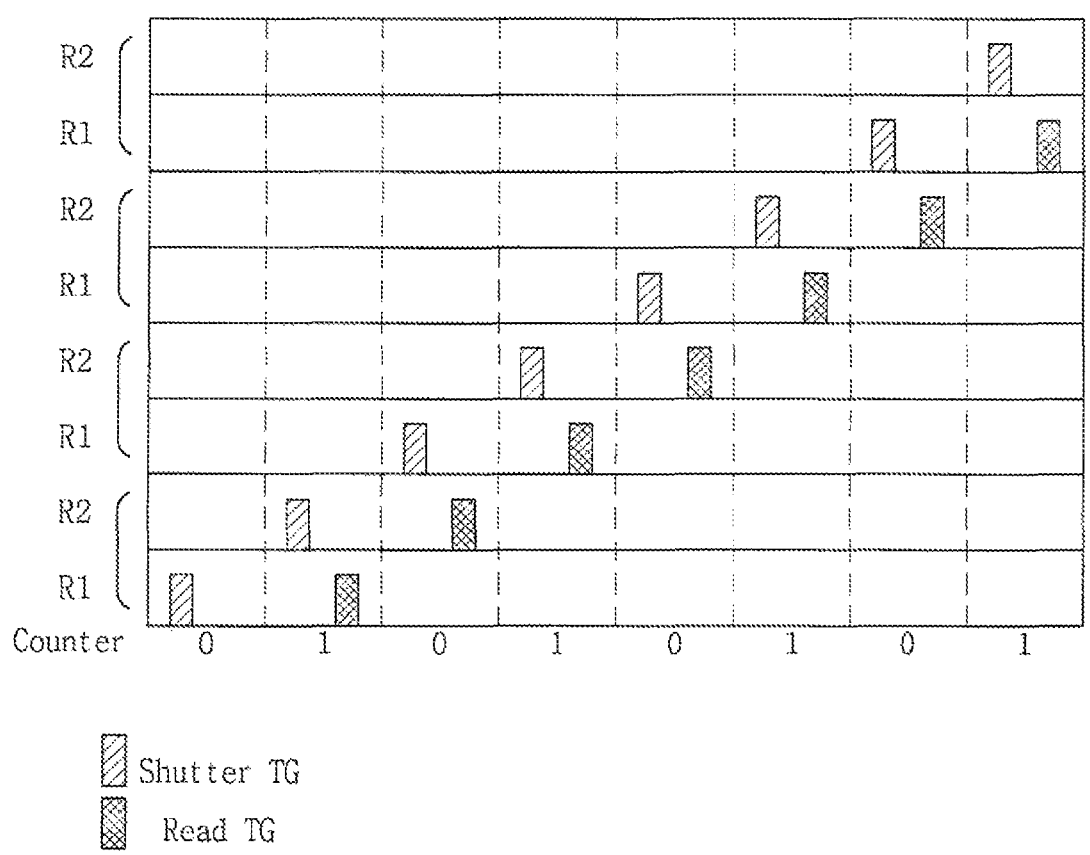
FIG. 9 is a timing diagram illustrating a method of operating the image sensor having the conventional structure shown in FIG. 1.

FIG. 8 is a timing diagram illustrating an operation of the image sensor 100 of FIG. 2, and FIG. 9 is a timing diagram illustrating a method of operating the image sensor having the conventional structure shown in FIG. 1.

Referring to FIG. 8, in the image sensor 100 shown in FIG. 2 according to the embodiment of the inventive concept, two rows R1 and R2 of a pixel array may operate simultaneously for a shutter operation and a read operation. Referring to FIG. 9, in the conventional image sensor, one row R1 or R2 may operate at one time for the shutter operation and the read operation. Therefore, the image sensor 100 according to the embodiment of the inventive concept having a metal configuration of a zigzag pattern for a row path and a column path of a pixel array may operate faster compared to the conventional image sensor.

Figure 10:
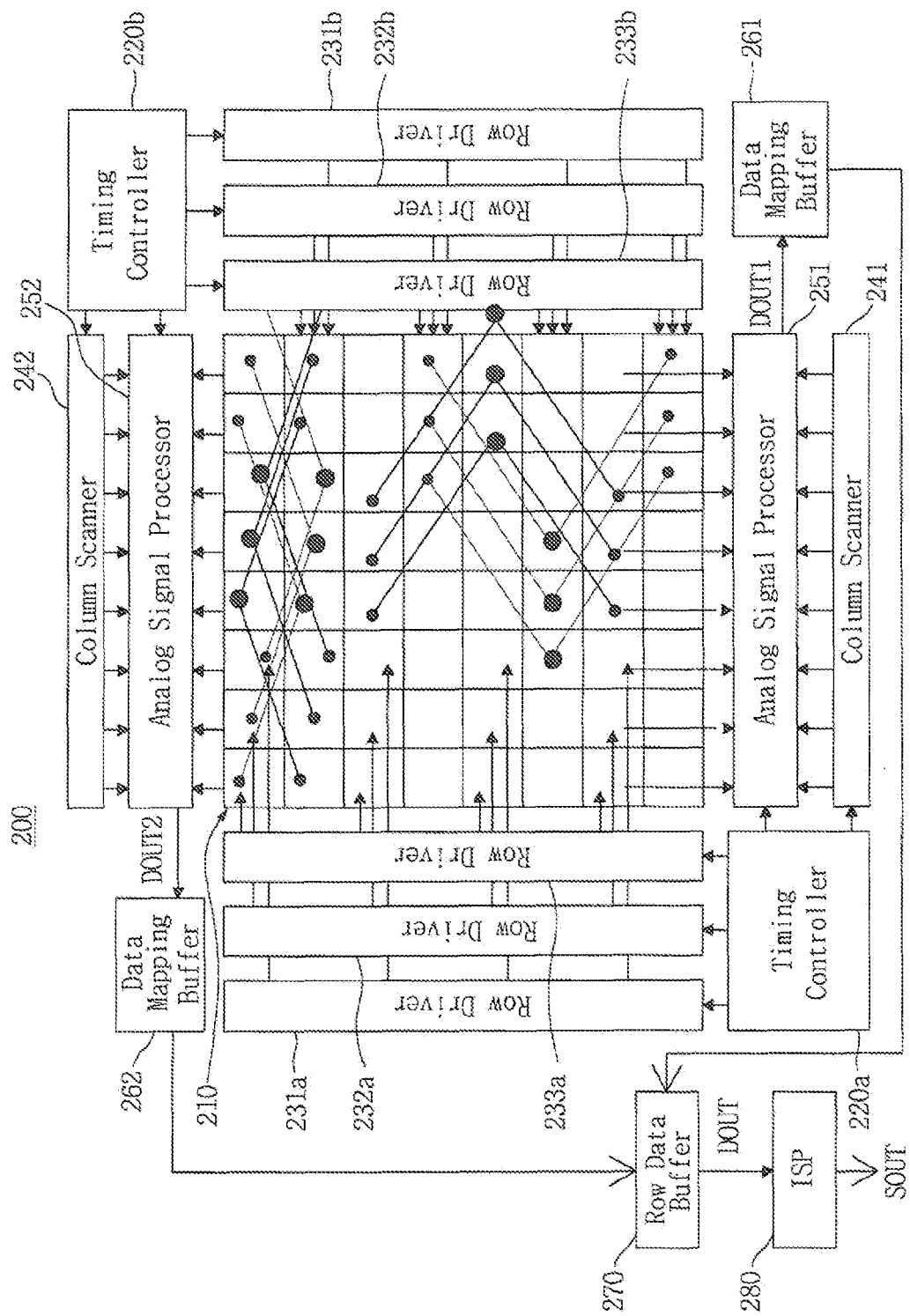
FIG. 10 is a block diagram illustrating an image sensor in accordance with another embodiment of the inventive concept.

FIG. 10 is a block diagram illustrating an image sensor 200 in accordance with another embodiment of the inventive concepts.

Referring to FIG. 10, the image sensor 200 may include timing controllers 220a and 220b, row drivers 231a, 232a, 233a, 231b, 232b, and 233b, a pixel array 210, analog signal processors 251 and 252, column scanners 241 and 242, data mapping buffers 261 and 262, a row data buffer 270, and an image signal processor 280. Circuit blocks included in the image sensor 200 may function in a similar manner as corresponding blocks in the image sensor 100 of FIG. 2.

In the image sensor 200, the first row drivers 231a, 232a, and 233a, which drive odd-numbered rows, may be disposed beside the left side of the pixel array 210, and second row drivers 231b, 232b, and 233b, which drive even-numbered rows, may be disposed beside the right side of the pixel array 210. Further, the first analog signal processor 251 that samples image signals of an odd-numbered row of the image signals, and performs analog-to-digital conversion on the sampled image signals may be disposed under the pixel array 210, and the second analog signal processor 252 that samples image signals of an even-numbered row of the image signals, and performs analog-to-digital conversion on the sampled image signals may be disposed over the pixel array 210. Further, the first column scanner 241, which continuously selects a unit circuit of the first analog signal processor 251, may be disposed under the pixel array 210, and the second column scanner 242, which continuously selects a unit circuit of the second analog signal processor 252, may be disposed over the pixel array 210.

Figure 11:
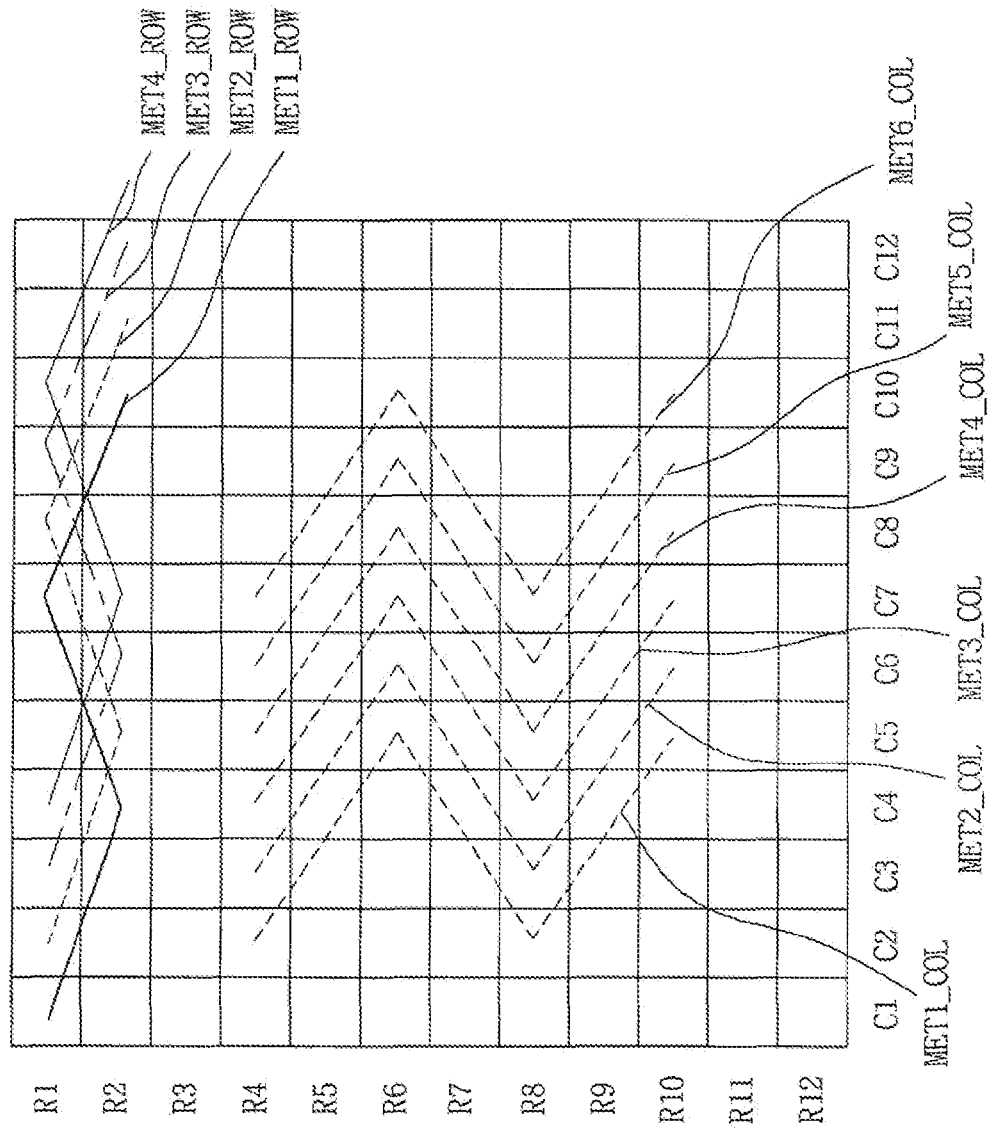
FIGS. 11 to 14 are diagrams illustrating metal layout configurations of the pixel array in accordance with an embodiment of the inventive concept.
Figure 12:
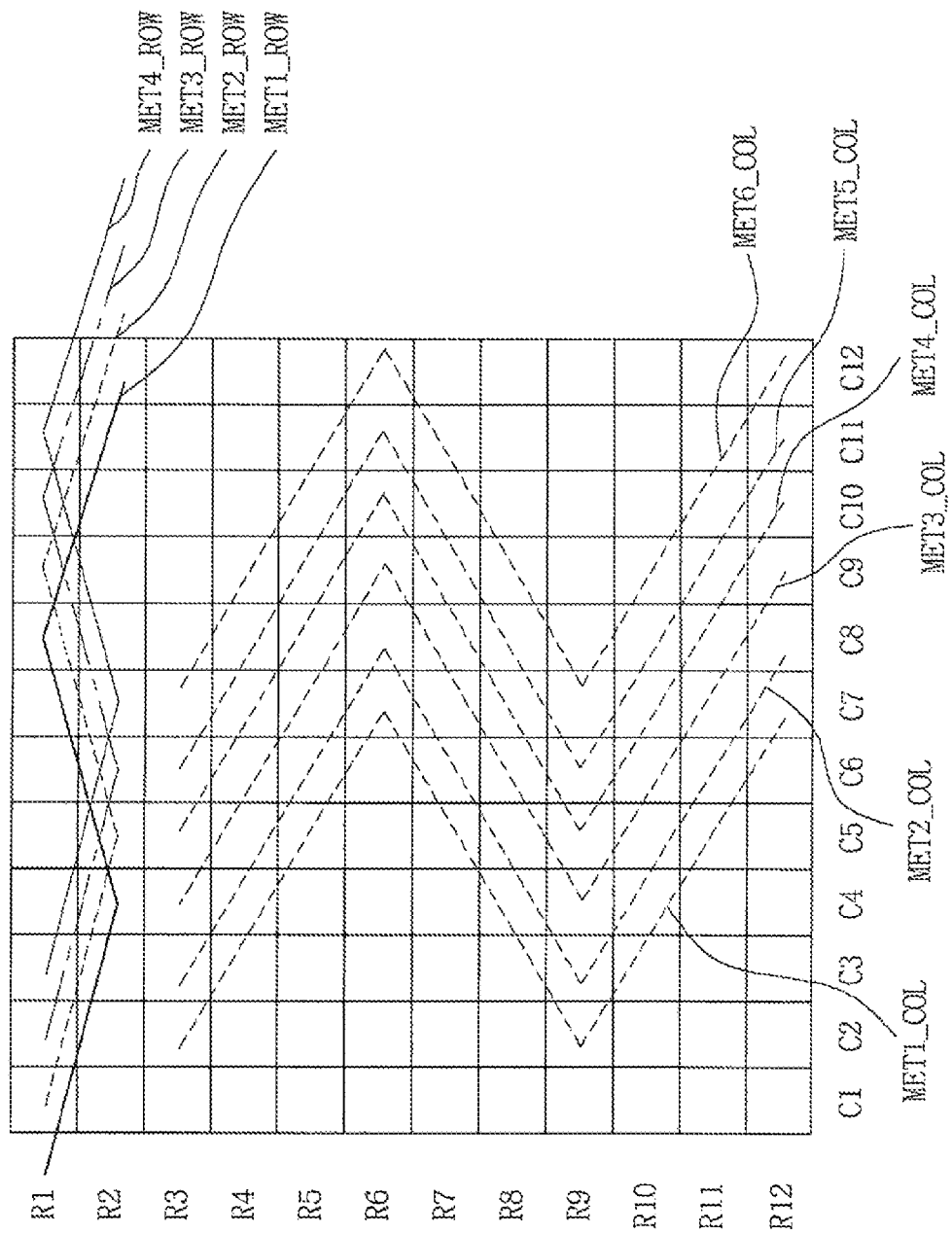
Figure 13:
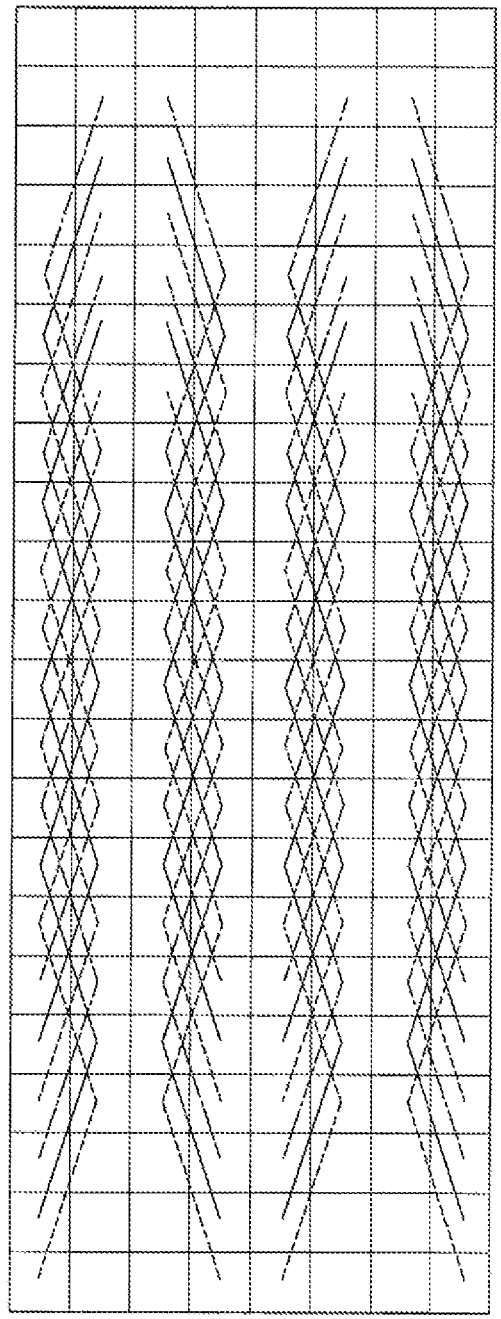
Figure 14:
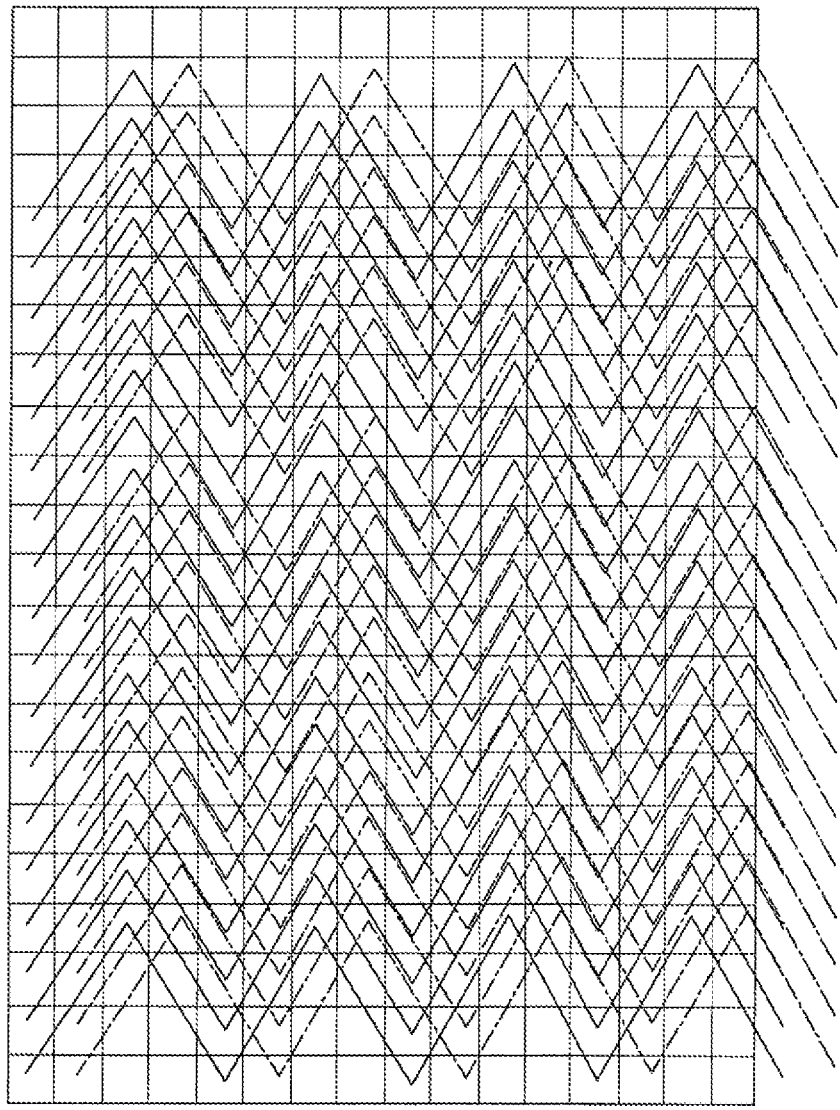

FIGS. 11 to 14 are diagrams illustrating metal layout configurations of a pixel array in accordance with various embodiments of the inventive concepts. FIG. 11 is a diagram illustrating a metal layout for a row path and a column path in a pixel array when a bad pixel correction kernel is a (5*5) array, and FIG. 12 is a diagram illustrating a metal layout for row paths and column paths in a pixel array when the bad pixel correction kernel is a (9*9) array. FIG. 13 is a diagram illustrating a metal layout for a plurality of row paths when the bad pixel correction kernel is a (5*5) array, and FIG. 14 is a diagram illustrating a metal layout for a plurality of column paths when the bad pixel correction kernel is a (5*5) array.

Referring to FIGS. 11 and 12, metal lines MET1_ROW, MET2_ROW, MET3_ROW, and MET4_ROW for a row path of the pixel array, and metal lines MET1_COL, MET2_COL, MET3_COL, and MET4_COL for a column path of the pixel array may have a nonlinear pattern, such as a zigzag pattern, instead of a straight line. Therefore, the image sensors 100 and 200 according to embodiments of the inventive concept may reduce generation of a line-type fixed pattern noise, because the image sensors 100 and 200 have metal lines disposed in a nonlinear (zigzag) pattern for the row path and the column path of the pixel array. Furthermore, when defects in the unit pixel are generated, the defected pixels may be compensated by the image signal processor 180 or 280.

Figure 15:
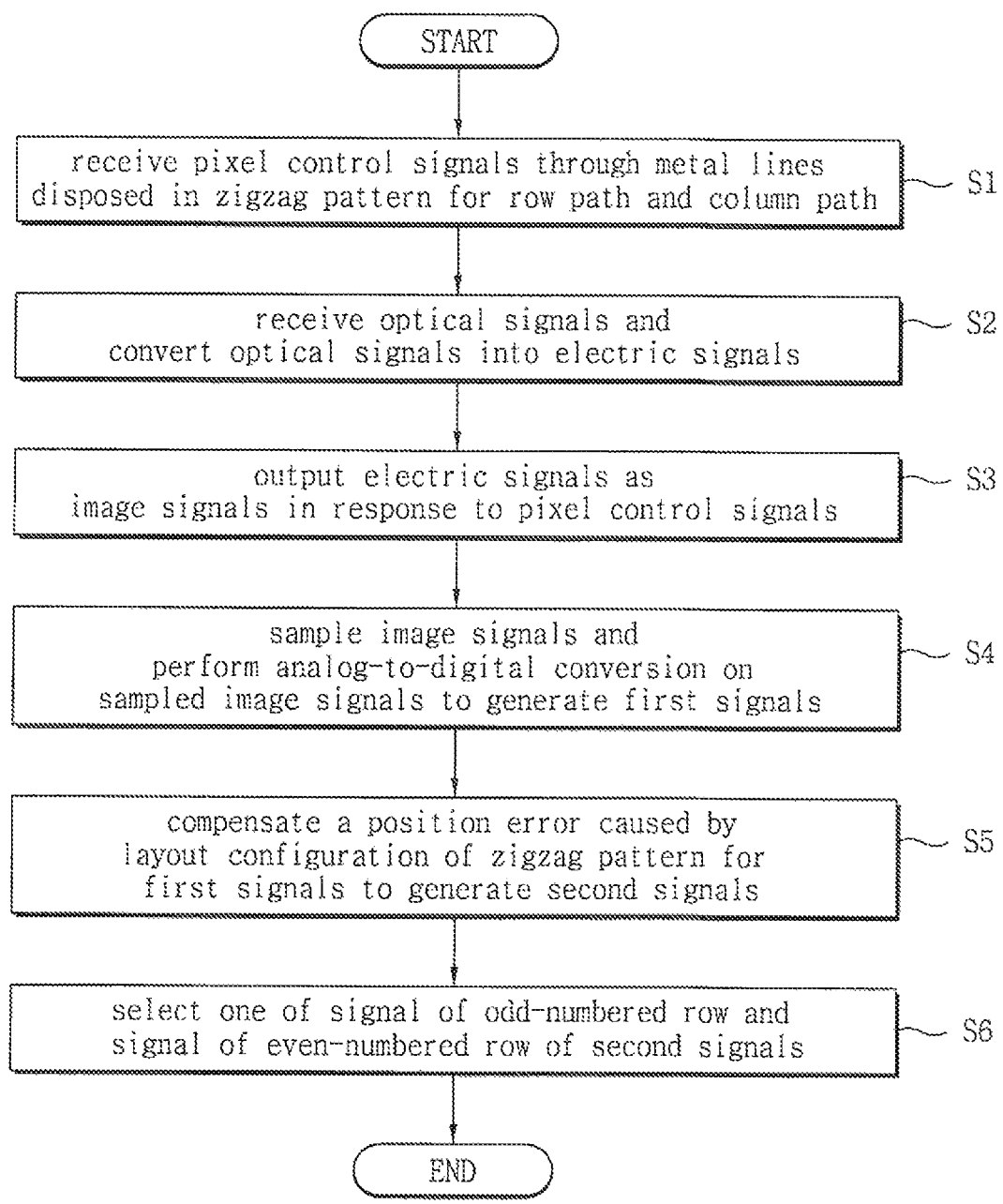
FIG. 15 is a flow chart illustrating a method of operating an image sensor in accordance with an embodiment of the inventive concept.

FIG. 15 is a flow chart illustrating a method of operating an image sensor in accordance with an embodiment of the inventive concepts.

Referring to FIG. 15, the method of operating an image sensor in accordance with an embodiment of the inventive concept may include the following operations:

(1) receiving pixel control signals through metal lines disposed in a zigzag pattern for a row path and a column path (S1);

(2) receiving optical signals and converting the optical signals into electric signals (S2);

(3) outputting the electric signals as image signals in response to the pixel control signals (S3);

(4) sampling the image signals and performing analog-to-digital conversion on the sampled image signals to generate first signals (S4);

(5) compensating a position error caused by the layout configuration of the zigzag pattern for the first signals to generate a second signals (S5); and (6) selecting one of a signal of an odd-numbered row and a signal of an even-numbered row of the second signals (S6).

Figure 16:
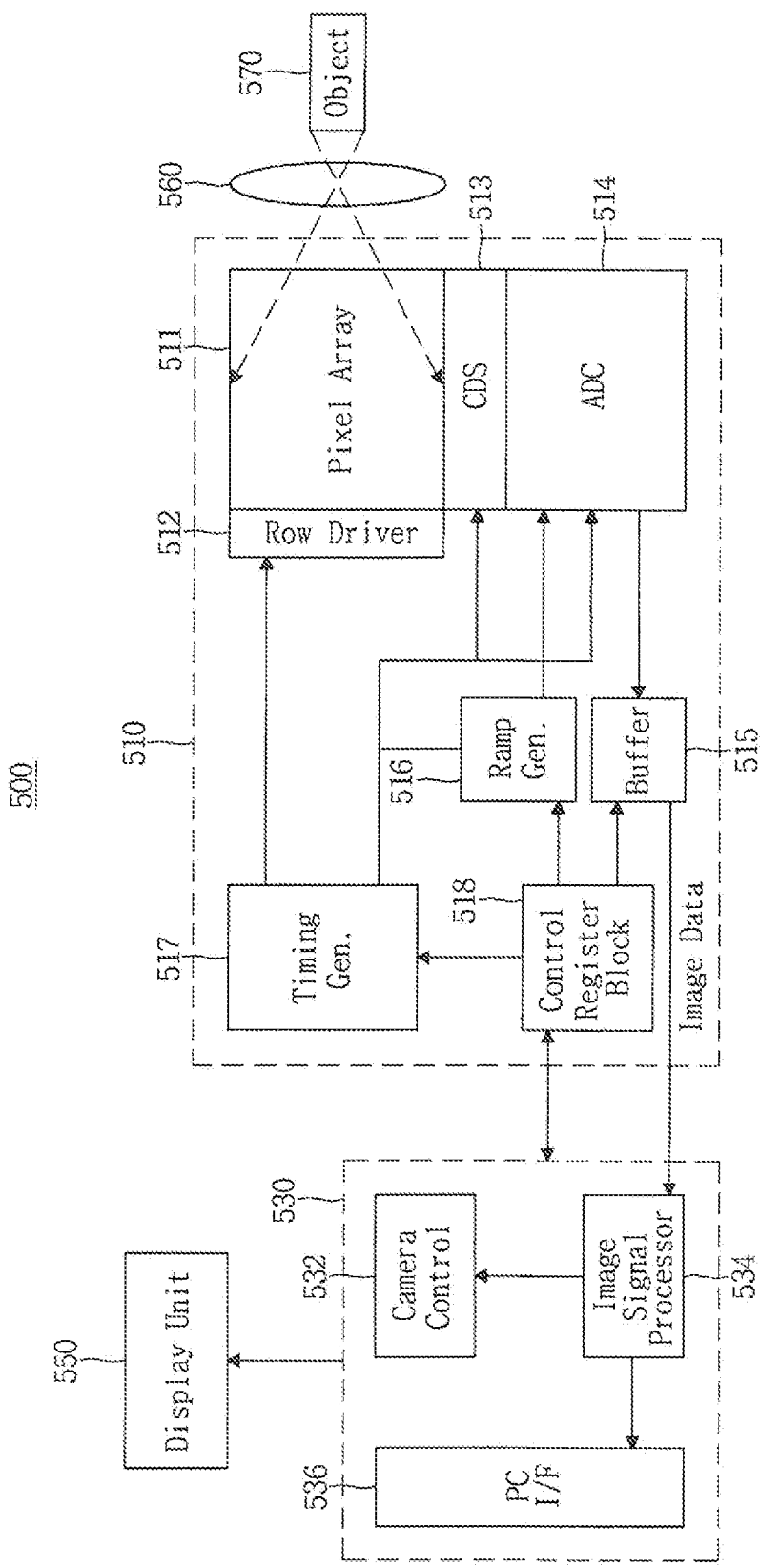
FIG. 16 is a block diagram illustrating an image processing device including the image sensor in accordance with embodiments of the inventive concept.

FIG. 16 is a block diagram illustrating an image processing device including an image sensor in accordance with embodiments of the inventive concepts.

Referring to FIG. 16, the image processing device 500 may include an image sensor 510, an image processor 530, a display unit 550, and an optical lens 560.

The image processing device 500 may include a digital camera, a data processing device that includes the digital camera, such as a personal computer (PC), a mobile phone, a smart phone, a tablet PC, or an information technology device. The digital camera may be a digital single-lens reflex (DSLR) camera.

The image sensor 510 may convert optical image signals of an object 570, input through the optical lens 560 under a control of the image processor 530, to electrical image signals.

The image sensor 510 may include a control register block 518. The control register block 518 may generate control signals for controlling operations of a ramp signal generator 516, a timing generator 517, and a buffer 515. The operation of the control register block 518 may be controlled by a camera controller 532.

The image processor 530 controls the operation of the image sensor 510, processes image data output from the image sensor 510, and transfers the processed data to the display unit 550 to display the processed data. The image data may be generated according to an output signal of the buffer 515. Here, the display unit 550 may include all the devices for outputting image signals. For example, the display unit 550 may include output terminals of a computer, a mobile phone, and other image devices.

The image processor 530 may include the camera controller 532, an image signal processor 534 and PC I/F 536.

The camera controller 532 controls the control register block 518. The image signal processor 534 modifies and processes image data output from the buffer 515, and outputs the modified and processed data to the display unit 550 through the PC I/F 536.

The image signal processor 534 shown in FIG. 16 may be included in the image processor 530, and may also be included in the image sensor 510. That is, the image sensor 510 may be implemented in one chip with the image signal processor 534.

Figure 17:
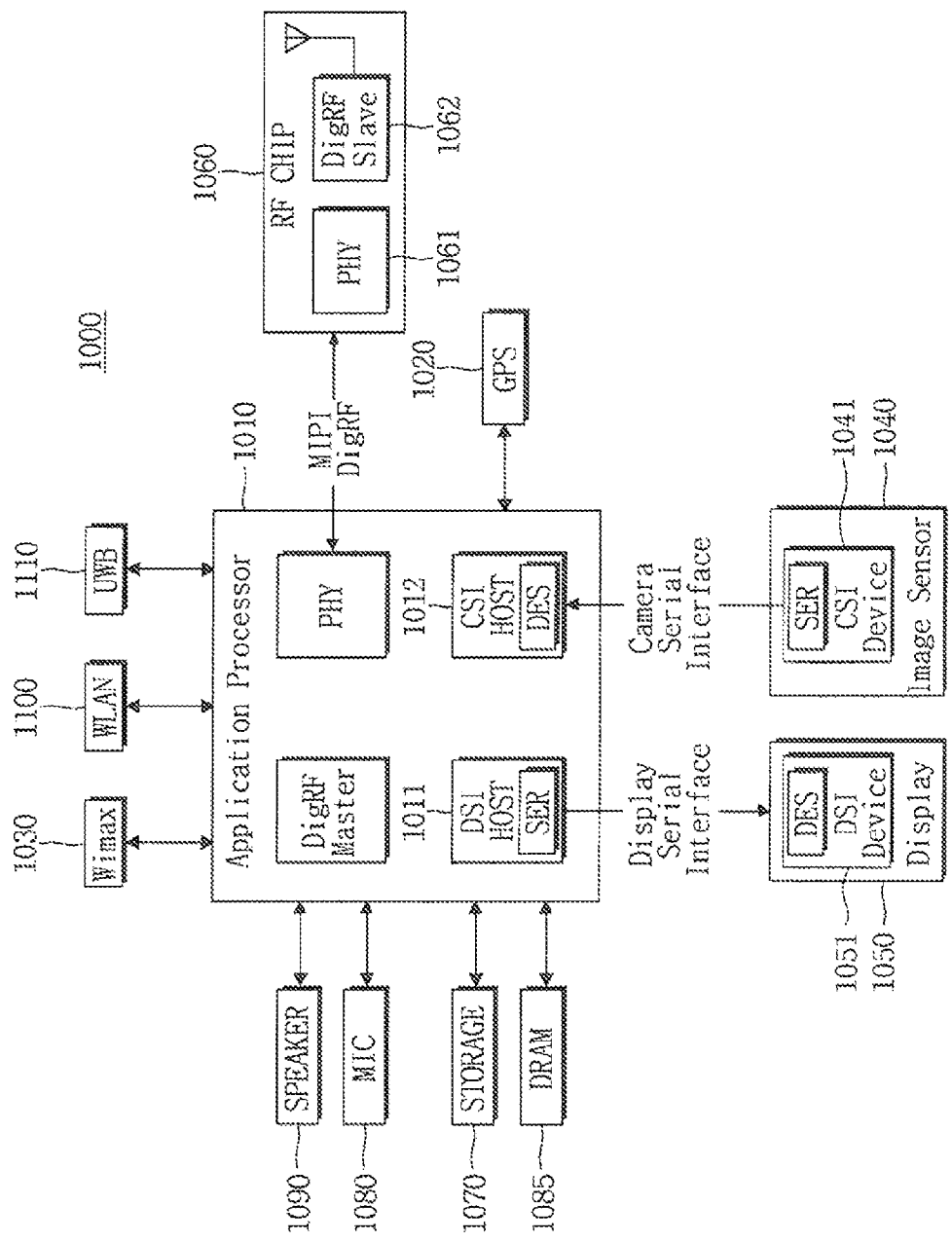
FIG. 17 is a block diagram illustrating an electronic system including the image sensor in accordance with embodiments of the inventive concept.

FIG. 17 is a block diagram illustrating an electronic system including the image sensor 100 or 200 in accordance with embodiments of the inventive concept.

Referring to FIG. 17, the electronic system 1000 may be implemented by a data processing device that may use or support a mobile industry processor interface (MIPI), for example, a mobile phone, a personal digital assistant (PDA), a portable multimedia player (PMP), or a smart phone.

The electronic system 1000 may include an application processor 1010, an image sensor 1040, and a display 1050.

A CSI HOST 1012 implemented in the application processor 1010 may perform a serial communication with a CSI device 1040 of the image sensor 1040 through a camera serial interface (CSI). The CSI HOST 1012 may include an optical serializer, and a DS1 device 1051 may include an optical deserializer.

The electronic system 1000 may further include an RF chip 1060 that communicates with the application processor 1010. A PHY 1061 of the electronic system 1000 and a PHY of the application processor 1010 may receive or transmit data according to a MIPI DigRF.

The electronic system 1000 may further include a global positioning system (GPS) 1020, a storage unit 1070, a microphone (MIC) 1080, a DRAM 1085, and a speaker 1090. Further, the electronic system 1000 may communicate using a WiMAX (Word Interoperability for Microwave access) 1030, a WLAN (wireless LAN) 1100, and a UWB (ultra-wideband) 1110 interface.

The image sensor according to embodiments of the inventive concept has a metal line structure in which metal lines are disposed in a zigzag pattern for a row path and a column path of a pixel array. Further, in the image sensor according to the embodiments of the inventive concept, two adjacent rows included in the pixel array may operate simultaneously. Therefore, the image sensor according to the embodiments of the inventive concept may reduce a number of line-type defects, and have high production yield and a high operating speed.

Embodiments of the inventive concept may apply to an image sensor, and an image processing device including the image sensor.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An image sensor, comprising:
a row driver configured to generate pixel control signals;
a pixel array including a plurality of rows and a plurality of columns each having pixels, wherein the pixels are connected by metal lines in a layout configuration having a nonlinear pattern for a row path and a column path, configured to receive optical signals and convert the optical signals into electric signals, and configured to output the electric signals as image signals in response to the pixel control signals;
an analog signal processor configured to sample the image signals, and perform analog-to-digital conversion on the sampled image signals to generate first signals;
a data mapping buffer configured to compensate position errors caused by the layout configuration of the nonlinear pattern for the first signals to generate second signals; and
a row data buffer configured to select one of a signal of odd-numbered row and a signal of even-numbered row of the second signals,
wherein the data mapping buffer comprises:
a first data mapping buffer configured to compensate position errors caused by the layout configuration of the nonlinear pattern for signals corresponding to odd-numbered row of the first signals; and
a second data mapping buffer configured to compensate a position error caused by the layout configuration of the nonlinear pattern for signals corresponding to even-numbered row of the first signals.

2. The image sensor of claim 1, wherein the nonlinear pattern comprises a zigzag pattern.

3. The image sensor of claim 1, further comprising:
a column scanner configured to select a unit circuit of the analog signal processor, the unit circuit corresponding to a column of the pixel array.

4. The image sensor of claim 1, further comprising:
an image signal processor configured to compensate signals corresponding to bad pixels included in output signals of the row data buffer.

5. The image sensor of claim 1, wherein the analog signal processor comprises:
a first analog signal processor configured to sample image signals of an odd-numbered row of the image signals, and perform analog-to-digital conversion on the sampled image signals; and
a second analog signal processor configured to sample image signals of an even-numbered row of the image signals, and perform analog-to-digital conversion on the sampled image signals.

6. The image sensor of claim 5, wherein the first analog processor is disposed on a first side of the pixel array, and the second analog signal processor is disposed on a second side of the pixel array opposite the first analog processor.

7. The image sensor of claim 1, wherein two adjacent rows included in the pixel array are configured to operate simultaneously.

8. The image sensor of claim 1, wherein the row driver comprises:
a first row driver that drives an odd-numbered row of the pixel array; and
a second row driver that drives an even-numbered row of the pixel array,
wherein the first row driver is disposed beside a first side of the pixel array and the second row driver is disposed beside a second side of the pixel array opposite the first side.

9. The image sensor of claim 1, wherein metal lines of a row path and a column path are disposed in the nonlinear pattern so that only one pixel in a pixel block of (5*5) comprised of five rows and five columns is accessed.

10. The image sensor of claim 1, wherein metal lines of a row path and a column path are disposed in the nonlinear pattern so that only one pixel in a pixel block of (9*9) comprised of nine rows and nine columns is accessed.

11. The image sensor of claim 1, wherein a fixed pattern noise (FPN) is not generated in a row direction or in a column direction in the pixel array.

12. An image sensor, comprising:
a pixel array including a plurality of pixels arranged in rows and columns, wherein the pixels are connected by metal lines in a layout configuration having a nonlinear pattern for a row path and a column path, wherein the pixels are configured to receive optical signals and to convert the optical signals into electric signals, and wherein the pixel array is configured to output the electric signals as pixel data; and
a data mapping buffer configured to receive the pixel data and to rearrange the pixel data into row and column order to compensate for the nonlinear pattern of the layout configuration of the metal lines,
wherein the data mapping buffer comprises:
a first data mapping buffer configured to compensate position errors caused by the layout configuration of the nonlinear pattern for signals corresponding to odd-numbered row of the electric signals; and
a second data mapping buffer configured to compensate a position error caused by the layout configuration of the nonlinear pattern for signals corresponding to even-numbered row of the electric signals.

13. The image sensor of claim 12, wherein the nonlinear pattern comprises a zigzag pattern.

14. The image sensor of claim 12, wherein the pixel array comprises a first pixel having a first color, a first plurality of pixels of the first color proximate the first pixel and a second plurality of pixels of the first color more distal to the first pixel than the first plurality of pixels, wherein a first one of the metal lines that connects to the first pixel does not connect to any of the first plurality of pixels of the first color so that a defect in the first one of the metal lines does not affect any of the first plurality of pixels.

15. An image sensor, comprising:
a pixel array including:
a plurality of pixels arranged in a plurality of physical rows and a plurality of physical columns,
a plurality of metal lines connecting the plurality of pixels in a plurality of logical rows and a plurality of logical columns, wherein the physical rows and physical columns do not correspond to the logical rows and the logical columns, wherein the pixels are configured to receive optical signals and to convert the optical signals into electric signals, and wherein the pixel array is configured to output the electric signals as pixel data; and
a data mapping buffer configured to receive the pixel data and to rearrange the pixel data from logical row and logical column order into physical row and physical column order,
wherein the data mapping buffer comprises:
a first data mapping buffer configured to compensate position errors caused by a layout configuration of a nonlinear pattern for signals corresponding to odd-numbered row of the electric signals; and
a second data mapping buffer configured to compensate a position error caused by the layout configuration of the nonlinear pattern for signals corresponding to even-numbered row of the electric signals.

16. The image sensor of claim 15, wherein the metal lines form nonlinear patterns.

17. The image sensor of claim 15, wherein the metal lines form zigzag patterns.

18. The image sensor of claim 15, wherein the pixel array comprises a first pixel having a first color, a first plurality of pixels of the first color proximate the first pixel and a second plurality of pixels of the first color more distal to the first pixel than the first plurality of pixels, wherein a first one of the metal lines that connects to the first pixel does not connect to any of the first plurality of pixels of the first color so that a defect in the first one of the metal lines does not affect any of the first plurality of pixels.

* * * * *